(12) United States Patent
Greenberger et al.

(10) Patent No.: US 10,277,834 B2
(45) Date of Patent: Apr. 30, 2019

(54) SUGGESTION OF VISUAL EFFECTS BASED ON DETECTED SOUND PATTERNS

(71) Applicant: International Business Machines Corporation, Armonk, NY (US)

(72) Inventors: Jeremy A. Greenberger, Raleigh, NC (US); Zachary M. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/402,271

(22) Filed: Jan. 10, 2017

(65) Prior Publication Data

US 2018/0198990 A1    Jul. 12, 2018

(51) Int. Cl.
| | | |
|---|---|---|
| *G10L 15/00* | (2013.01) | |
| *H04N 5/262* | (2006.01) | |
| *G10L 21/10* | (2013.01) | |
| *G10L 25/57* | (2013.01) | |
| *G10L 25/51* | (2013.01) | |
| *G10L 15/26* | (2006.01) | |
| *G10L 25/78* | (2013.01) | |

(52) U.S. Cl.
CPC ........... *H04N 5/2621* (2013.01); *G10L 21/10* (2013.01); *G10L 25/57* (2013.01); *G10H 2210/076* (2013.01); *G10L 15/26* (2013.01); *G10L 25/51* (2013.01); *G10L 25/78* (2013.01)

(58) Field of Classification Search
USPC ................................. 704/231–257, 270–275
See application file for complete search history.

(56) References Cited

U.S. PATENT DOCUMENTS

| | | |
|---|---|---|
| 5,358,407 A | 10/1994 | Lainer |
| 6,084,169 A | 7/2000 | Hasegawa et al. |
| 7,120,626 B2 | 10/2006 | Li et al. |
| 8,630,423 B1 | 1/2014 | Elliott |
| 8,689,103 B2 | 4/2014 | Lindley et al. |
| 9,225,897 B1 | 12/2015 | Sehn |

(Continued)

FOREIGN PATENT DOCUMENTS

| | | |
|---|---|---|
| CA | 2 895 728 A1 | 1/2016 |
| CN | 103793447 A | 5/2014 |
| CN | 104574453 A | 4/2015 |

OTHER PUBLICATIONS

"On-Demand Geofilters", https://snapchat.com/on-demand, Printed Nov. 23, 2016, 1 page.

(Continued)

*Primary Examiner* — Jesse S Pullias
(74) *Attorney, Agent, or Firm* — Michael A. Petrocelli; Maxine L. Barasch; Keohane & D'Alessandro PLLC

(57) ABSTRACT

Disclosed embodiments provide techniques for suggesting a visual effect based on detected sounds. The sounds can be speech and/or music. Tempo and song identification techniques may be used to determine criteria for selecting visual effects to present to a user. The user selects a visual effect from the suggested visual effects and applies the visual effect to an image acquired by a camera. A modified image that combines the original acquired image with the visual effect is transmitted to another user during communication such as video chat, or, alternatively, the modified image may be posted to a social media account.

20 Claims, 11 Drawing Sheets

(56) References Cited

U.S. PATENT DOCUMENTS

| | | | |
|---|---|---|---|
| 9,361,447 B1 | 6/2016 | Bowers et al. | |
| 9,646,195 B1* | 5/2017 | Kim | G06T 3/0093 |
| 9,813,642 B1* | 11/2017 | Chen | H04N 1/00244 |
| 2004/0174434 A1* | 9/2004 | Walker | G06F 17/30265 |
| | | | 348/211.3 |
| 2006/0065102 A1 | 3/2006 | Xu | |
| 2009/0067605 A1* | 3/2009 | Holm | G06T 13/205 |
| | | | 379/207.16 |
| 2012/0117473 A1 | 5/2012 | Han et al. | |
| 2012/0259634 A1 | 10/2012 | Tsunokawa | |
| 2013/0329060 A1 | 12/2013 | Yim | |
| 2014/0163980 A1 | 6/2014 | Tesch et al. | |
| 2017/0161382 A1* | 6/2017 | Ouimet | G06F 17/30817 |

OTHER PUBLICATIONS

Steven Tweedie, Business Insider, "Everyone Can Use Snapchat's New Geofilters Starting Today—Here's How They Work", http://www.businessinsidercom/how-to-use-snapchat-geofilters-2014-12, Dec. 2, 2014, 6 pages.

Shazam, https://play.google.com/store/apps/details?id=com.shazam.android&hl=en, Printed Nov. 23, 2016, 2 pages.

* cited by examiner

US 10,277,834 B2

SUGGESTION OF VISUAL EFFECTS BASED ON DETECTED SOUND PATTERNS

FIELD OF THE INVENTION

The present invention relates generally to video communication, and more particularly, to suggestion of visual effects based on detected sound patterns.

BACKGROUND

In recent years, communication via video chat applications has dramatically increased. The reduced cost of data communications, coupled with increasingly more powerful devices has made communication by video chat accessible to many people throughout the world. Additionally, the proliferation of social media has made sharing images such as photos and videos quick and convenient. As sharing of images through video chat and/or social media has increased in popularity, it is desirable to have improvements in the customization of these shared images.

SUMMARY

In an aspect of the disclosed embodiments, there is provided a computer-implemented method for providing a suggested visual effect based on a detected sound pattern, comprising: receiving a sound signal from a microphone coupled to a computing device; detecting a sound pattern within the sound signal; selecting a visual effect from a plurality of visual effects in a visual effects library; and presenting the visual effect as a selectable option in a user interface on the computing device.

In another aspect, there is provided a computer system comprising: a processor; a microphone; a camera; a memory coupled to the processor, the memory containing instructions, that when executed by the processor, perform the steps of: receiving a sound signal from the microphone; detecting a sound pattern within the sound signal; selecting a visual effect from a plurality of visual effects in a visual effects library; presenting the visual effect as a selectable option in a user interface on the computing device; and applying the visual effect to an image obtained by the camera upon selection of the presented visual effect.

In another aspect, there is provided a computer program product for providing a suggested visual effect based on a detected sound pattern for an electronic computing device comprising a computer readable storage medium having program instructions embodied therewith, the program instructions executable by a processor to cause the electronic device to: receive a sound signal from a microphone coupled to a computing device; detect a sound pattern within the sound signal; select a visual effect from a plurality of visual effects in a visual effects library; and present the visual effect as a selectable option in a user interface on the computing device.

BRIEF DESCRIPTION OF THE DRAWINGS

Features of the disclosed embodiments will be more readily understood from the following detailed description of the various aspects of the invention taken in conjunction with the accompanying drawings.

Figure 1:
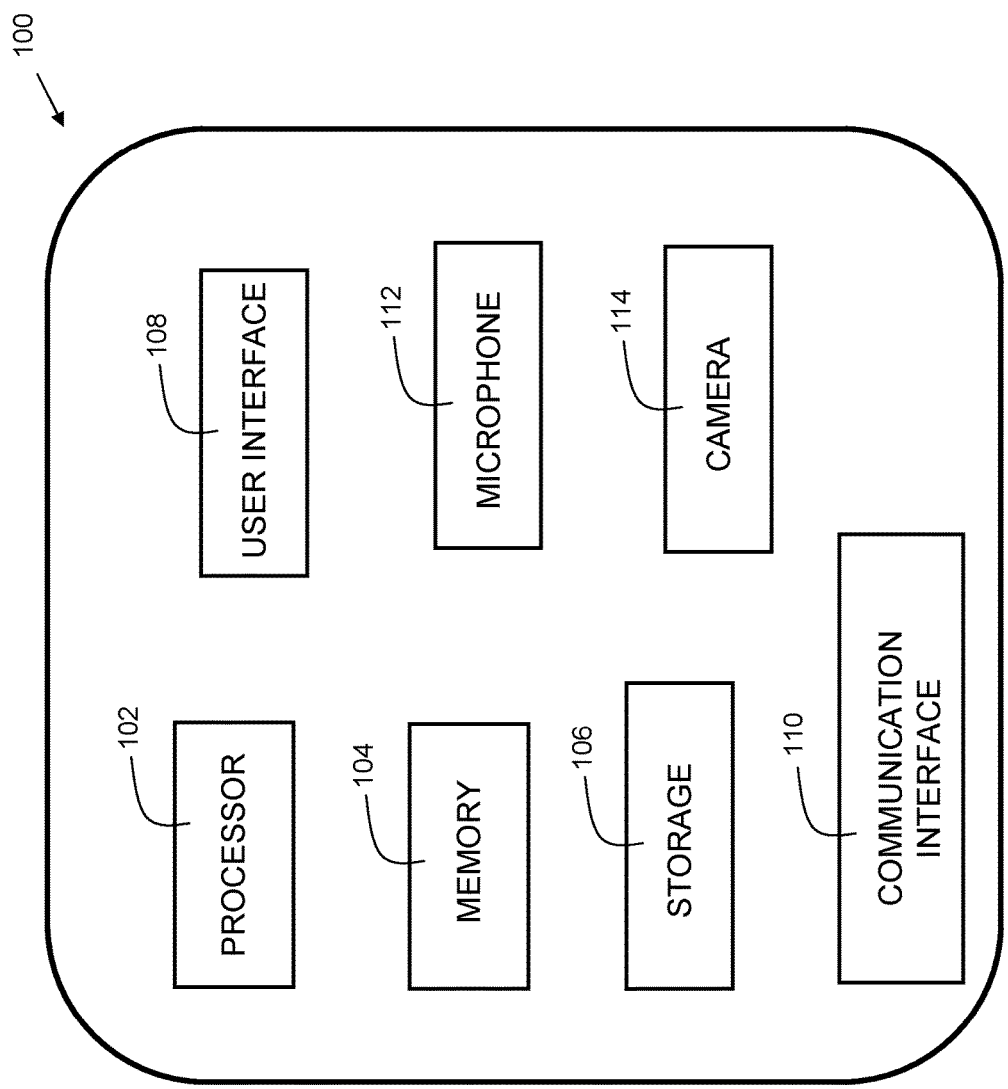
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for suggesting a visual effect based on detected sounds. The sounds can be speech and/or music. Tempo and song identification techniques may be used to determine criteria for selecting visual effects to present to a user. The user selects a visual effect from the suggested visual effects and applies the visual effect to an image acquired by a camera. A modified image that combines the original acquired image with the visual effect is transmitted to another user during communication such as video chat, or alternatively, the modified image may be posted to a social media account.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a block diagram of a device 100 in accordance with embodiments of the present invention. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se.

Device 100 may further include storage 106. In embodiments, storage 106 may include one or more magnetic storage devices such as hard disk drives (HDDs). In some embodiments, storage 106 may include one or more solid state drives (SSDs).

The memory 104 and storage 106 together provide memory for multiple applications to execute on processor 102. In embodiments, device 100 may have multiple processors 102, and/or multiple cores per processor. The device 100 may execute an operating system that provides virtual memory management for the device 100. The processor 102 may have one or more cache memories therein. Memory 104 stores instructions, which when executed by the processor, implement the steps of the present invention.

Device 100 further includes a user interface 108, examples of which include a liquid crystal display (LCD), a plasma display, a cathode ray tube (CRT) display, a light emitting diode (LED) display, an organic LED (OLED) display, or other suitable display technology. The user interface 108 may further include a keyboard, mouse, or other suitable human interface device. In some embodiments, user interface 108 may be a touch screen, incorporating a capacitive or resistive touch screen in some embodiments.

The device 100 further includes a communication interface 110. In some embodiments, the communication interface 110 may be a wired communication interface that includes Ethernet, Gigabit Ethernet, or the like. In embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network.

The device 100 further includes a microphone 112 and a camera 114. In some embodiments, the device 100 may include multiple cameras and/or microphones. In embodiments, the camera 114 is a user-facing camera, allowing device 100 to be used for applications such as video chat, live streaming, and other social media applications. During a use of the device for video chat, the camera 114 may be used to record video of the user while microphone 112 records ambient sounds, including the voice of the user.

Figure 2:
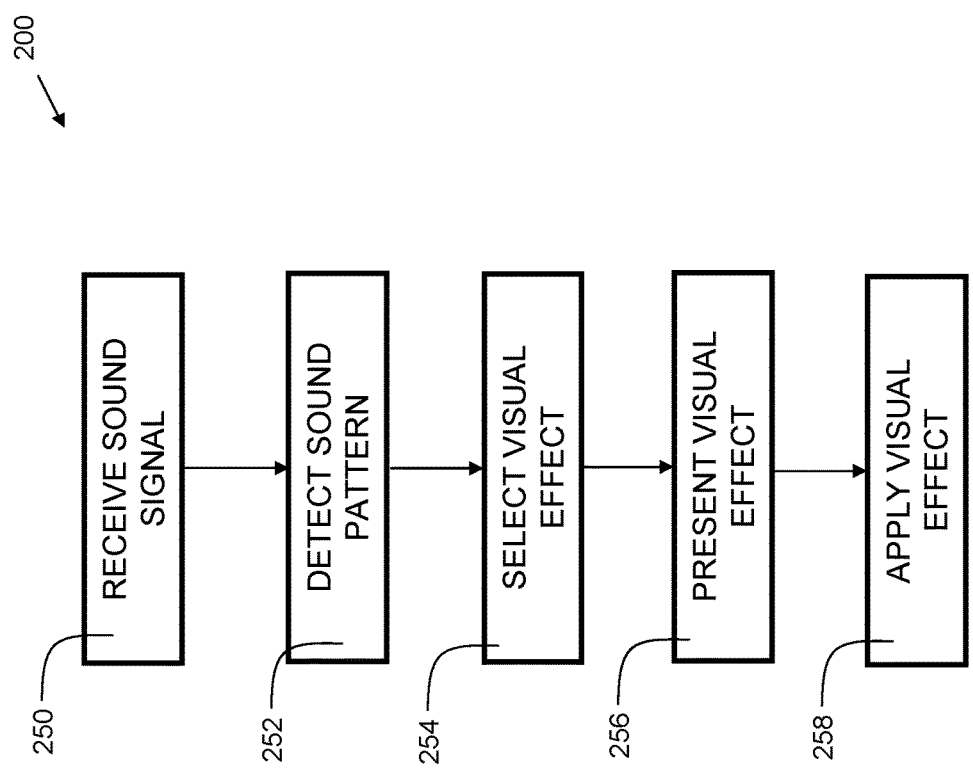
FIG. 2 is a flowchart indicating process steps for embodiments of the present invention.

FIG. 2 is a flowchart 200 indicating process steps for embodiments of the present invention. At process step 250, a sound signal is received. The sound signal may be received from a microphone that is integrated into the device 100. In some embodiments, the sound signal may be received from an external microphone that is coupled to the device 100 through a wired or wireless connection. In process step 252, a sound pattern is detected. In process step 254, a visual effect is selected based on the detected sound pattern. In process step 256, the visual effect is presented to the user. If the user decides to use the effect, the effect is applied in process step 258.

Figure 3:
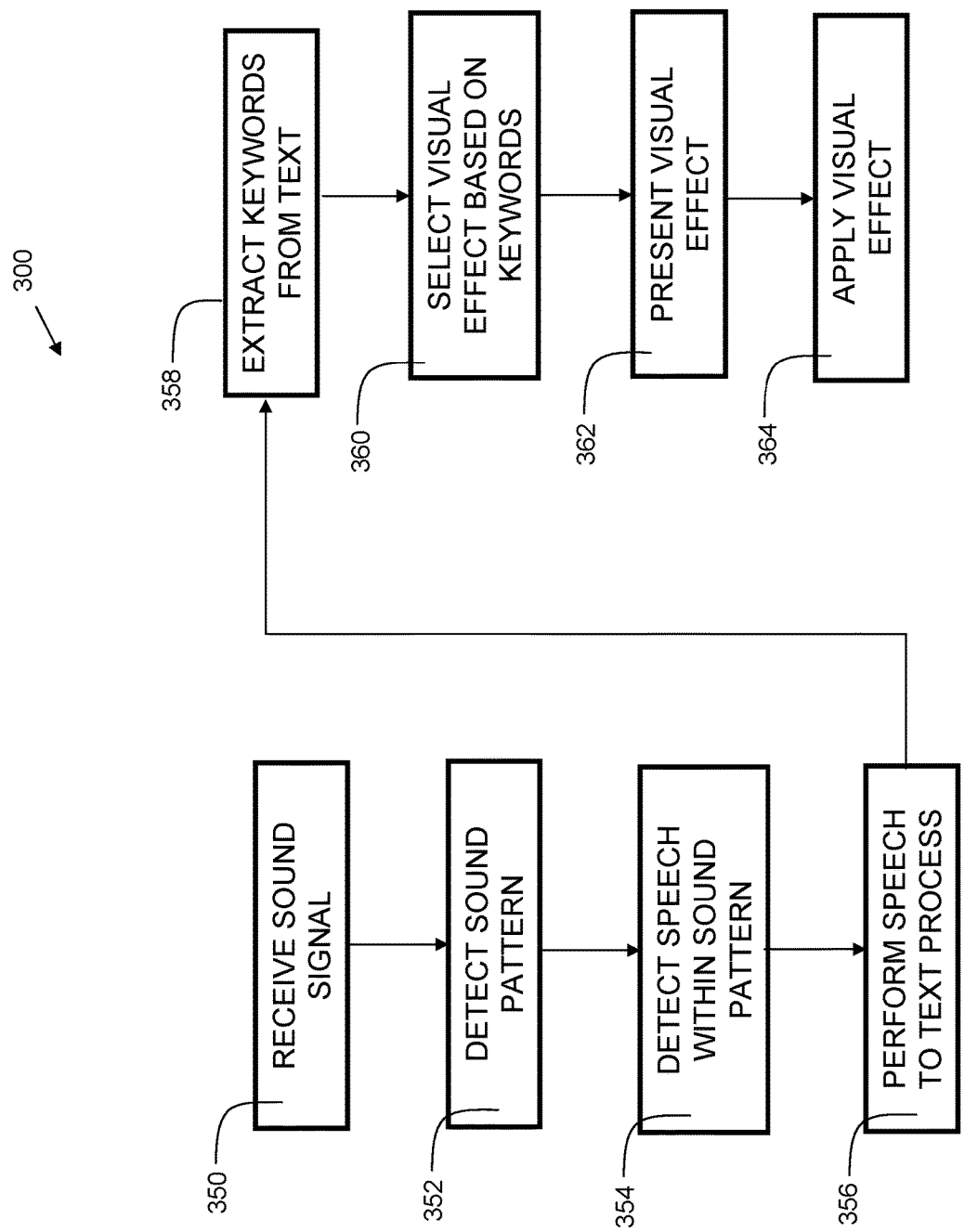
FIG. 3 is a flowchart indicating process steps for embodiments of the present invention using speech detection.

FIG. 3 is a flowchart 300 indicating process steps for embodiments of the present invention using speech detection. This is a more specific case of the general flow outlined in FIG. 2. At process step 350, a sound signal is received. The sound signal may be received from a microphone that is integrated into the device 100. In some embodiments, the sound signal may be received from an external microphone that is coupled to the device 100 through a wired or wireless connection. In process step 352, a sound pattern is detected. In process step 354, the sound pattern is detected as human speech. In process step 356, a speech-to-text process is performed to convert the sound pattern into a text string. In process step 358, keywords are extracted from the text string. The keyword extraction can include a variety of computer-implemented text processing techniques, including, but not limited to, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to). In process step 360, a visual effect is selected based on the detected keywords. This may include using the keywords to search a library of visual effects. In embodiments, each visual effect has associated metadata. Effects with metadata that is deemed relevant to the keywords may be selected. For example, if a detected keyword is "birthday," then visual effects with metadata related to birthdays can be selected for presentation to the user. In process step 362, the visual effect is presented to the user. If the user selects an option to use the effect, the effect is applied in process step 364. Thus, in embodiments, detecting a sound pattern comprises detecting human speech. Furthermore, embodiments can include performing a speech-to-text process on the human speech to derive a text string, extracting keywords from the text string, and where selecting a visual effect from a plurality of visual effects in a visual effects library includes performing a query of the visual effects library using the extracted keywords.

Figure 4:
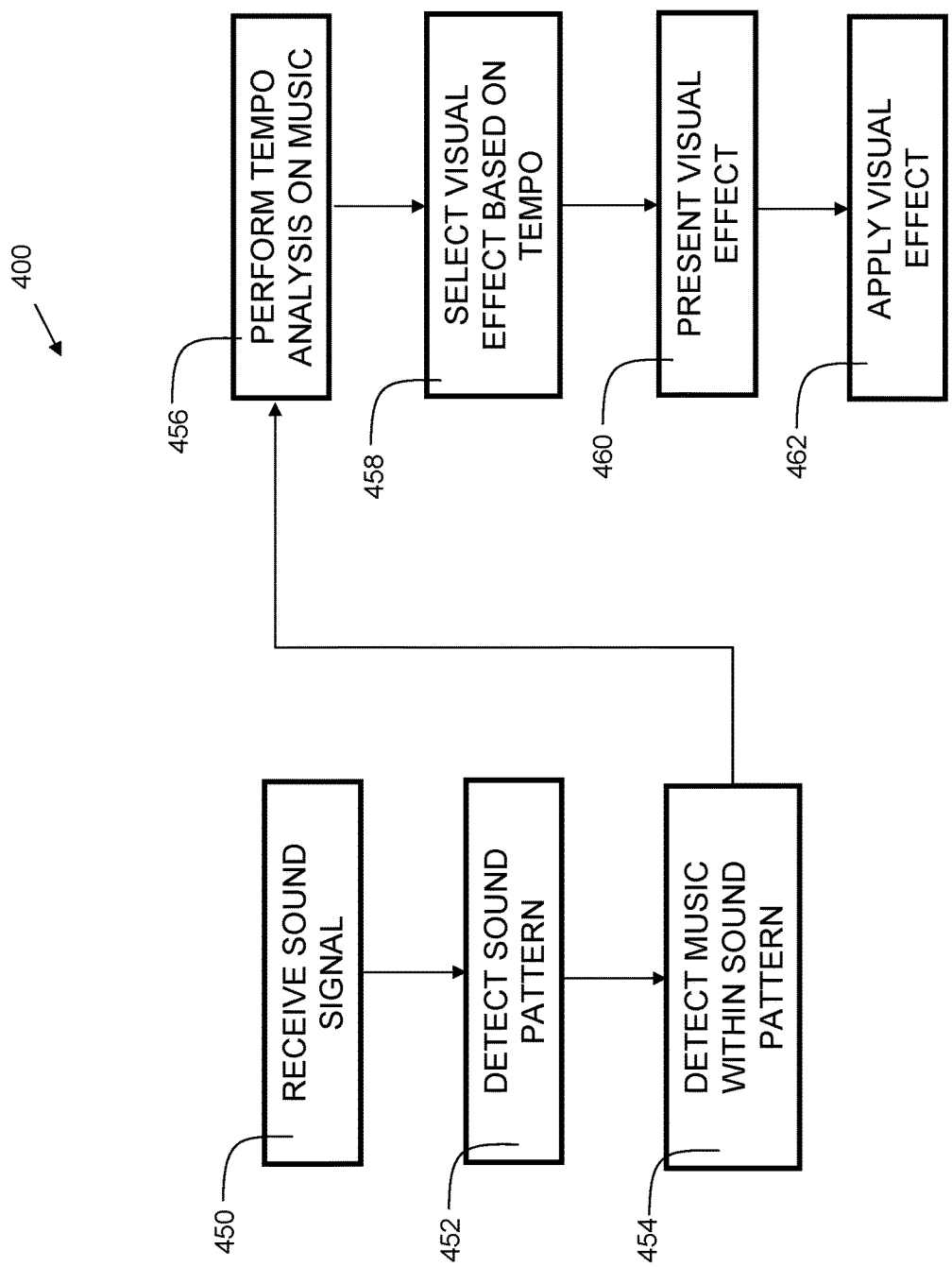
FIG. 4 is a flowchart indicating process steps for embodiments of the present invention using music tempo detection.

FIG. 4 is a flowchart 400 indicating process steps for embodiments of the present invention using music tempo detection. This is a more specific case of the general flow outlined in FIG. 2. At process step 450, a sound signal is received. The sound signal may be received from a microphone that is integrated into the device 100. In some embodiments, the sound signal may be received from an external microphone that is coupled to the device 100 through a wired or wireless connection. In process step 452, a sound pattern is detected. In process step 454, the sound pattern is detected as music. In process step 456, a tempo analysis is performed on the music. If the music is rhythmic, a tempo can be detected based on beat detection. The beat detection may include identifying periodic peaks in the amplitude of the music. Not all music is rhythmic, so in some cases, no tempo may be detected. In process step 458, a visual effect is selected based on the detected tempo. In some embodiments, a visual effect is selected when the tempo is above a predetermined threshold. In some embodiments, the predetermined threshold is 130 beats per minute (bpm). Thus, when music has a tempo higher than 130 bpm, it is assumed to be fast-paced dance music, and visual effects corresponding to fast-paced dance music may be selected. In process step 460, the visual effect is presented to the user. If the user decides to use the effect, the effect is applied in process step 462. Thus, in embodiments, detecting a sound pattern comprises detecting music. Furthermore, embodiments include performing a tempo detection process on the music to detect a tempo, and where selecting a visual effect from a plurality of visual effects in a visual effects library comprises performing a query of the visual effects library using the detected tempo.

Figure 5:
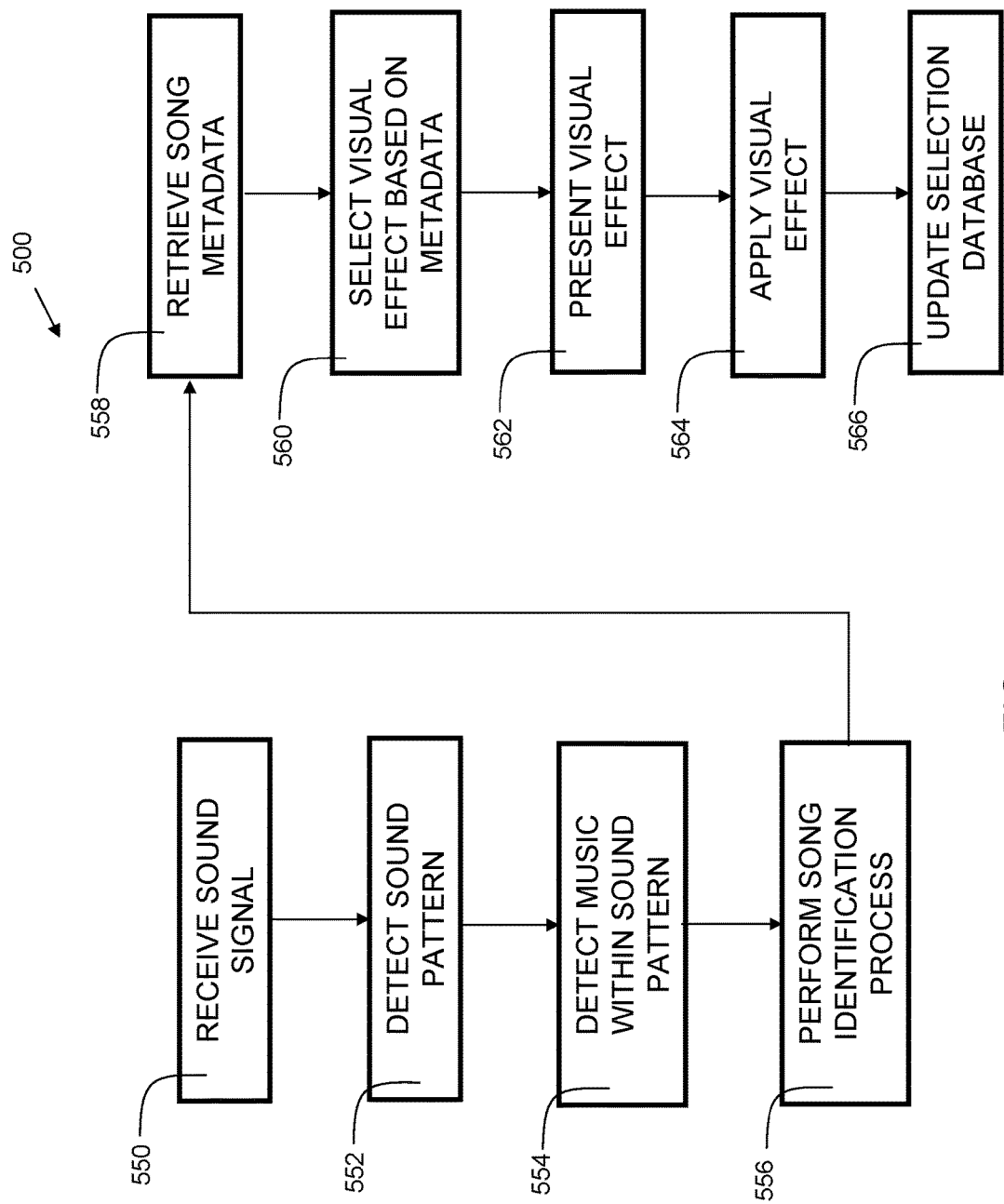
FIG. 5 is a flowchart indicating process steps for embodiments of the present invention using song identification.

FIG. 5 is a flowchart 500 indicating process steps for embodiments of the present invention using song identification. This is a more specific case of the general flow outlined in FIG. 2. At process step 550, a sound signal is received. The sound signal may be received from a microphone that is integrated into the device 100. In some embodiments, the sound signal may be received from an external microphone that is coupled to the device 100 through a wired or wireless connection. In process step 552, a sound pattern is detected. In process step 554, the sound pattern is detected as music.

In process step 556, a song identification process is performed on the music. This may include extracting a portion of the detected music into a signal format such as an amplitude plot and/or frequency plot. In some embodiments, the signal format may be a pulse coded modulation (PCM) format. The signal format may then be compared against a database of known songs to determine the song that is present in the detected sound pattern. In process step 558, metadata for the song is retrieved. The metadata may include, but is not limited to, song title, song artist, year of release, genre, composer, album name, and occasion category. The occasion category may include a list of appropriate occasions for this song. Example occasions can include birthday, Christmas, graduation, achievement, sports victories, sports defeats, motivation, comfort, and the like. In process step 560, a visual effect is selected based on metadata of the detected song. In process step 562, the visual effect is presented to the user. If the user selects an option to use the effect, the effect is applied in process step 564. Thus, in embodiments, detecting a sound pattern comprises detecting music. Furthermore, embodiments include performing a song detection process on the music to detect a song title (or other identifier), and where selecting a visual effect from a plurality of visual effects in a visual effects library comprises performing a query of the visual effects library using metadata derived from the song title (or other identifier). In some embodiments, the visual effects that a user ends up selecting are stored in a selection database at process step 566. The selection database can be part of a cognitive learning system. In embodiments, the database may be stored within the sound analysis system. Each time a visual effect is selected based on a given audio input, a point may be added to a table in the database. The next time a similar audio input is provided, visual effects with the highest point total are presented to the user. In this way, the system can learn over time which visual effects are most appropriate for a given audio input such as a song or spoken speech.

Figure 6:
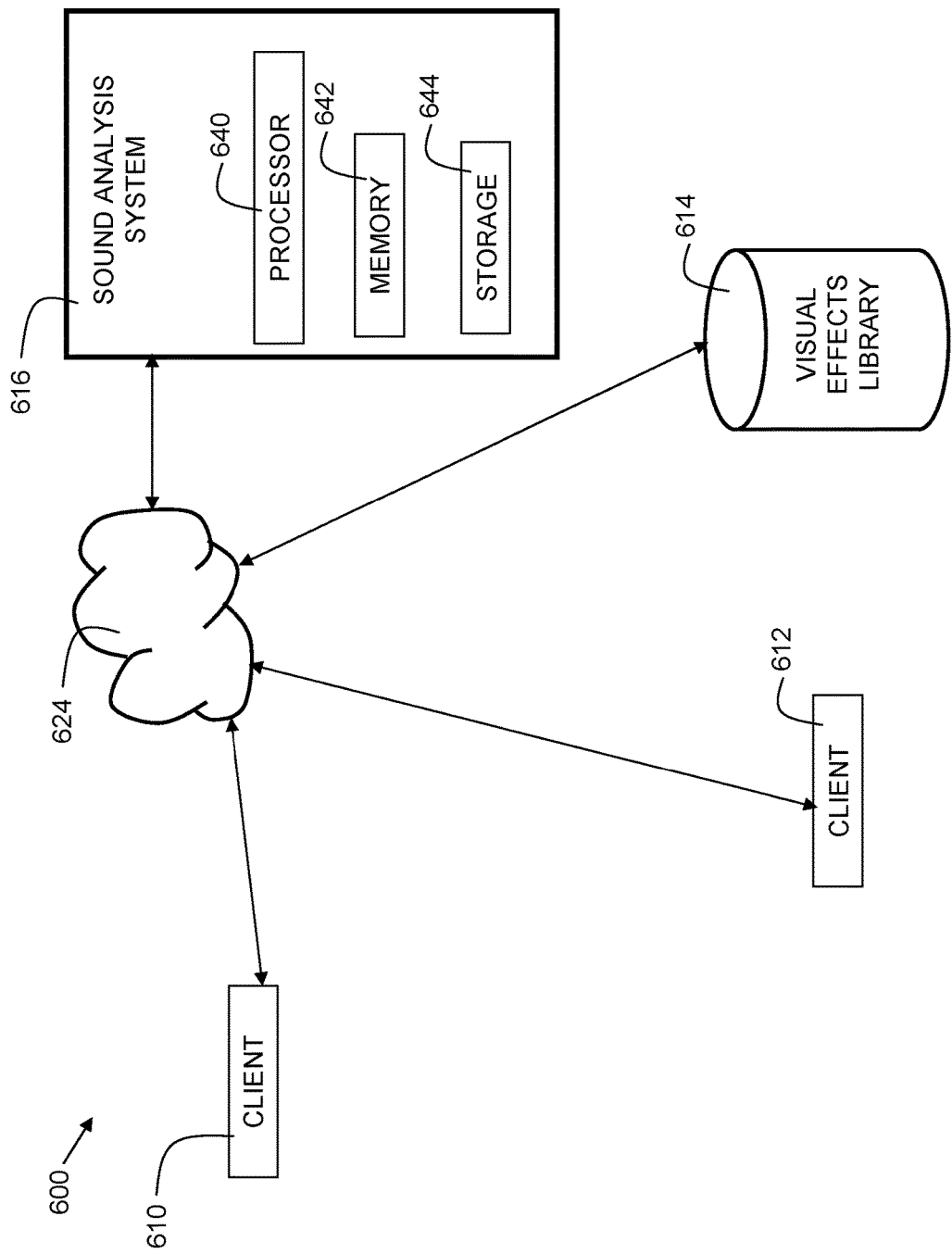
FIG. 6 is a block diagram for a system in accordance with embodiments of the present invention.

FIG. 6 is a block diagram 600 for a system in accordance with embodiments of the present invention. A client 610 and client 612 are configured to communicate with each other via network 624. In embodiments, network 624 includes the Internet. A sound analysis system 616 is a computer system also connected to network 624. Sound analysis system 616 includes a processor 640, a memory 642, and storage 644. The memory 642 may include RAM, ROM, Flash, or the like. The memory 642 contains instructions, that when executed by processor 640, may perform functions of some embodiments of the present invention. A visual effects library 614 is also accessible via network 624. In some embodiments, the visual effects library 614 may instead be stored within storage 644 of the sound analysis system 616. In some embodiments, the visual effects library 614 may be distributed among both internal memory (in the computer system) and external storage.

In usage of disclosed embodiments, client 610 and client 612 may communicate with each other using a video chat program. Each client device may be similar to the device described in FIG. 1. In embodiments, the client devices may be smartphones, tablet computers, laptop computers, desktop computers, or the like, equipped with webcams.

In some embodiments, a microphone within client device 610 detects ambient sound, and sends a sample of that sound to the sound analysis system 616 via network 624. In some embodiments, the sound sample may be compressed prior to transmission. In some embodiments, the sound sample may be compressed with a lossy compression scheme such as MP3. In other embodiments, the sample may be compressed via a lossless compression scheme such as a Lempel-Ziv variant and/or Huffman coding techniques. In other embodiments, the sample may be transmitted as uncompressed PCM data. In some embodiments, the sample may be sent via TCP/IP, UDP, or other suitable transmission protocols. The sound analysis computer, upon receiving the sound sample, may perform one or more processing steps to perform a song identification of the sample.

The processing may include performing a spectral analysis to determine intensities at various frequency ranges. In some embodiments, the spectral analysis determines frequency intensity at frequencies ranging from 100 Hz to 10 kHz in 100 Hz increments. In some embodiments, a Discrete Fourier Transform (DFT) may be performed as part of the spectral analysis. In some embodiments a Fast Fourier Transform (FFT) process is used. In some cases, windowing may be performed as part of the DFT process. In embodiments, a Hamming window is used for the windowing. In other embodiments, a Blackman window is used for the windowing. Other windows may be used as appropriate to analyze the signal while minimizing artifacts due to spectral leakage. The spectral analysis may be used as part of a recording fingerprint. In addition, a tempo analysis may instead or also be performed on the music as previously described. In order to identify the music, the sound analysis computer 616 may first identify a subset of stored acoustic fingerprints having a tempo in the range of the recording fingerprint. Then, the spectral components of the recording fingerprint are compared to fingerprints stored in the sound analysis computer. When a stored fingerprint is deemed to match, its associated metadata is retrieved, such as song title, artist, and the like. Based on the metadata, one or more relevant visual effects are identified within visual effects library 614, and a list of the relevant effects can be sent to clients 610 and 612 for presentation to a user for selection. While the aforementioned example illustrated processing occurring on the sound analysis system 616, in other embodiments, some or all of this processing may occur on the client devices 610 and 612. While two clients are shown in the figure, in implementations, more or fewer may be included.

Figure 7A:
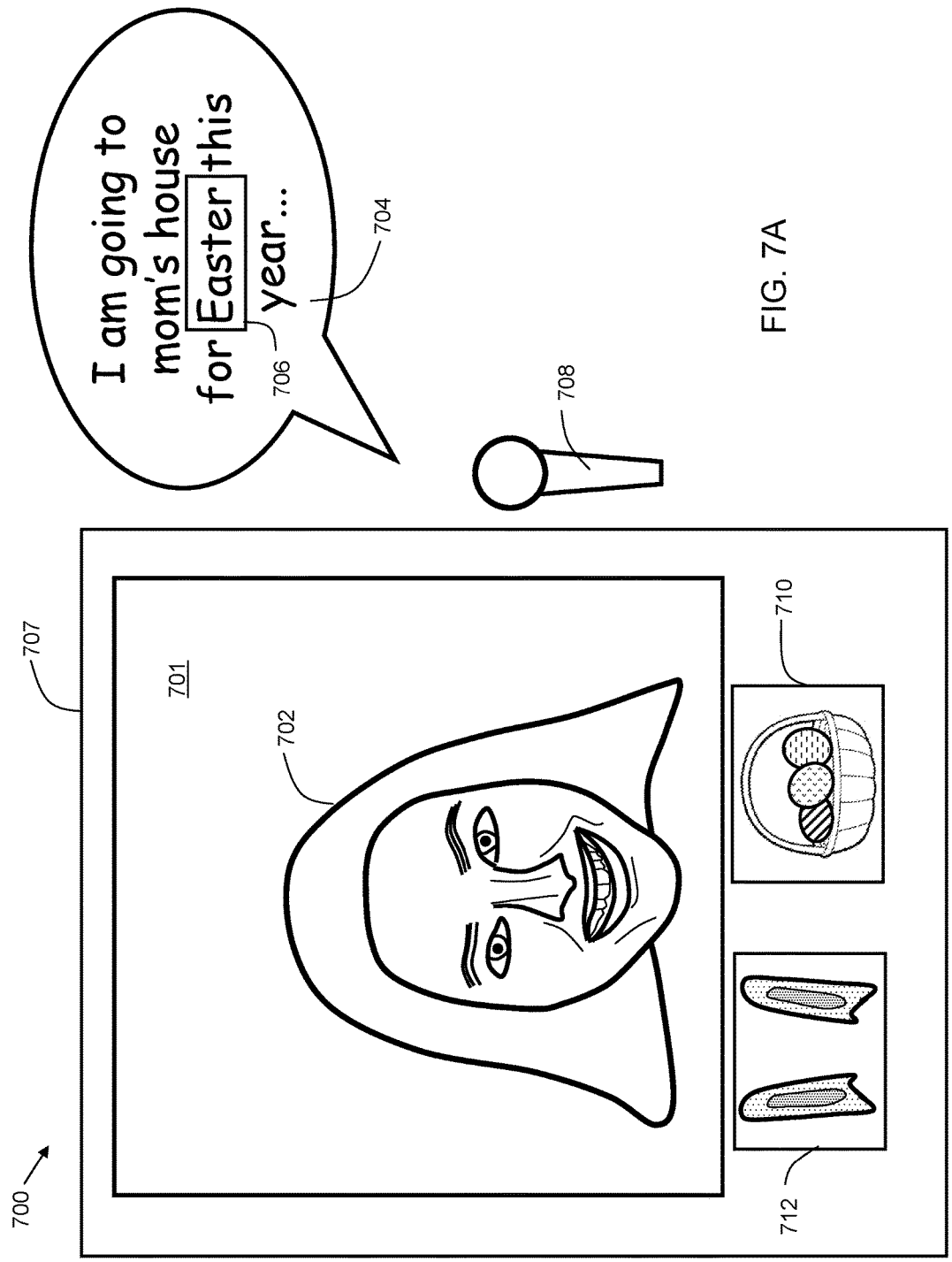
FIG. 7A is an example illustrating presentation of effects based on a speech detection process.

FIG. 7A is an example 700 illustrating presentation of effects based on a speech detection process. In the example, a user interface 707 includes an image frame 701 that is shown with a face 702 of a user shown within it. The user is uttering speech 704, which is detected by microphone 708. While microphone 708 is illustrated as an external microphone, in practice, the microphone may be integrated into the user's device (e.g., tablet or smartphone) such as is shown in FIG. 1. A speech-to-text process converts the utterance to text and identifies the word "Easter" 706 as a keyword. A visual effects library is then searched, and two effects deemed relevant are presented. The visual effects, bunny ears 712, and Easter basket 710, are presented to the user below the image frame 701. The user can select (e.g., by touch, click, or other method) one of the visual effects to be applied. Thus, embodiments include presenting the visual effect as a selectable option in a user interface on the computing device.

Figure 7B:
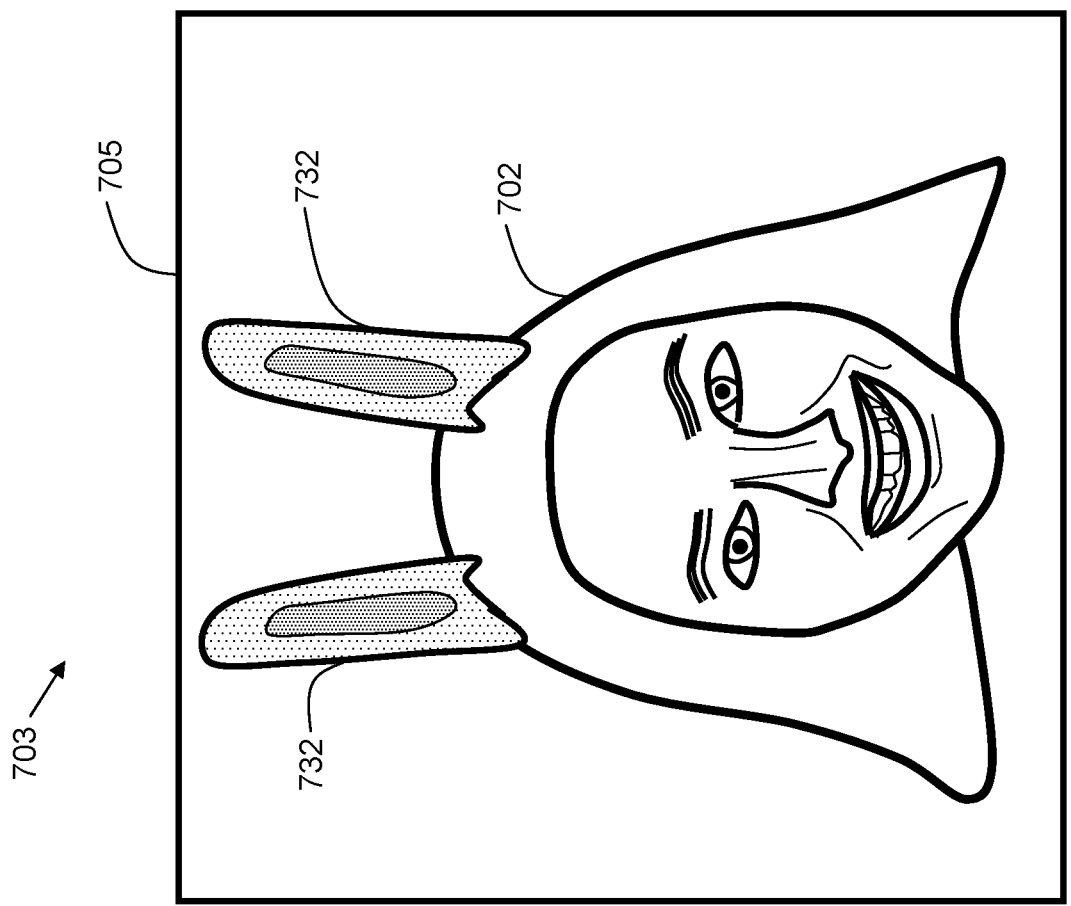
FIG. 7B is an example showing application of an effect presented in FIG. 7A.

FIG. 7B is an example 703 showing application of an effect presented in FIG. 7A. In the example, the user selected the bunny ears 712. The bunny ears are then rendered as 732 and included in the image frame 705 on the face 702 of the user. The bunny ears 732 may be rendered as an image in an RGB format or other suitable image format, and then composited onto the image captured by the camera of the user's device. In some embodiments, an alpha blending algorithm may be used to adjust the transparency of the visual effect (in this case, the bunny ears 732). In some embodiments, the transparency may be zero, such that the visual effect appears solid. In embodiments, facial tracking may be used so that the visual effect can track the movement of the face 702. Thus, as the user moves, the bunny ears appear to "stay on" the user's head. In embodiments, the image of the face 702 combined with the visual effect 732 is transmitted from a first client to a second client. Thus, referring again to FIG. 6, the user of client 610 may select a visual effect such as the bunny ears, and then the image of the face combined with the bunny ears is transmitted to client 612 via network 624. Thus, the user of client 612 sees the image as shown in FIG. 7B. The visual effect 712 is considered as an overlay effect since it is applied over the images captured by the camera of the user's device. Thus, in embodiments, selecting a visual effect comprises selecting an overlay.

Figure 8:
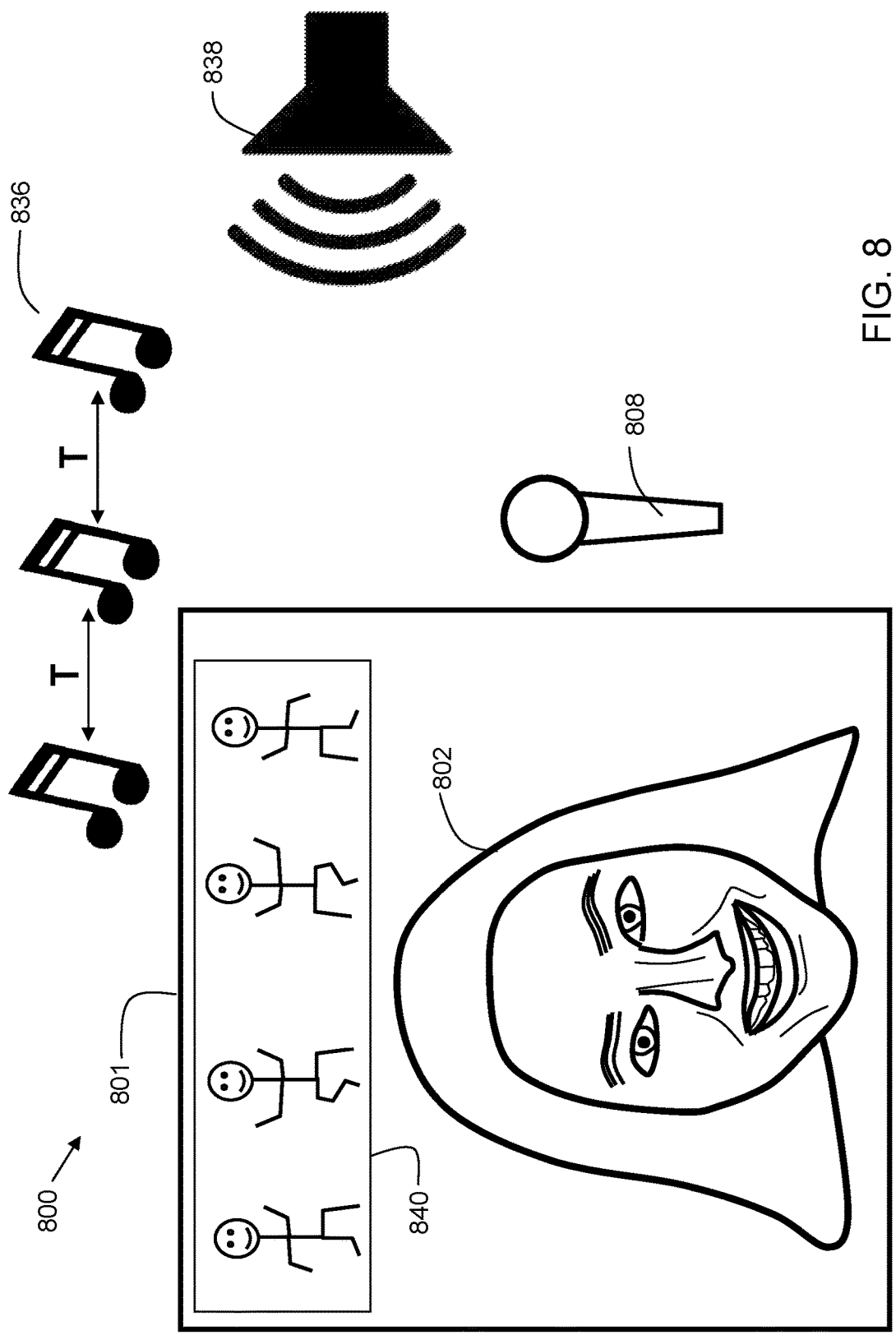
FIG. 8 is an example illustrating presentation of effects based on a music tempo detection process.

FIG. 8 is an example 800 illustrating presentation of effects based on a music tempo detection process. In the example, an image frame 801 is shown (e.g. rendered on a screen of an electronic device) with a face 802 of a user shown within it. In embodiments, an external speaker 838 is outputting music 836. External speaker 838 may be from a nearby television, radio, stereo, or the like. The music 836 is detected by microphone 808. While microphone 808 is illustrated as an external microphone, in practice, the microphone may be integrated into the user's device (e.g., tablet or smartphone). A tempo detection process is performed on the music and a time interval T is identified between beats of the music to derive a beats per minute (bpm) value for the music. When the tempo is detected to be above a predetermined threshold (e.g. 130 bpm), then a visual effect 840 of dancing stick figures may be applied above face 802. In some embodiments, the visual effect 840 may remain within image frame 801 for a predetermined time after the music 836 stops. For example, in some embodiments, the visual effect 840 may continue to be presented for 30 seconds after the music stops. In some embodiments, the time duration that the visual effect continues to be presented after the music has stopped is configurable by a user. The visual effect 840 is considered as an overlay effect since it is applied over the images captured by the camera of the user's device. Thus, in embodiments, selecting a visual effect comprises selecting an overlay.

Figure 9A:
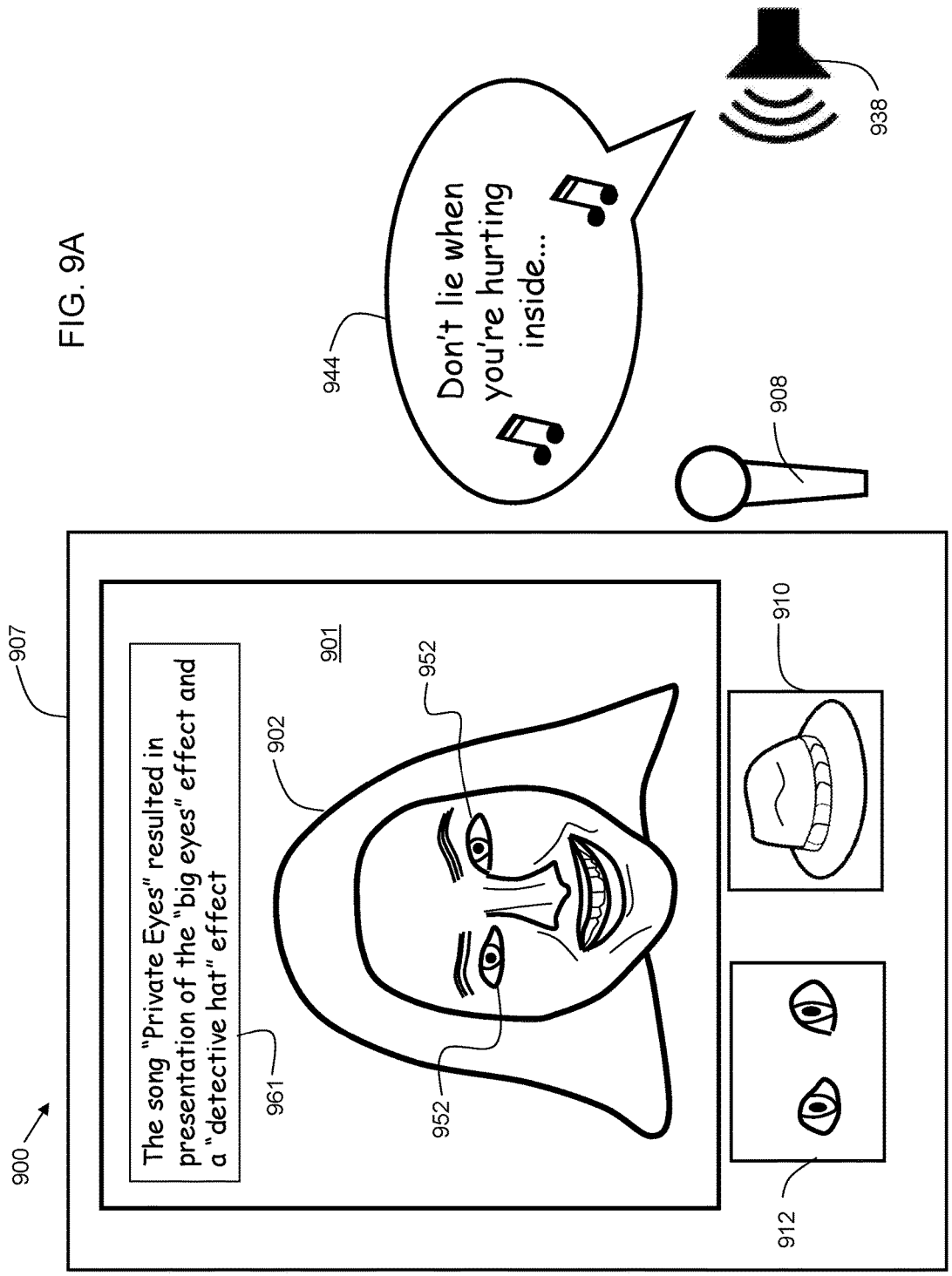
FIG. 9A is an example illustrating presentation of effects based on a song identification process.

FIG. 9A is an example 900 illustrating presentation of effects based on a song identification process. In the example, a user interface 907 includes an image frame 901 that is shown with a face 902 of a user shown within it. In embodiments, an external speaker 938 is outputting music 944. External speaker 938 may be from a nearby television, radio, stereo, or the like. The music 944 is detected by microphone 908. While microphone 908 is illustrated as an external microphone, in practice, the microphone may be integrated into the user's device (e.g., tablet or smartphone). A song detection process detects a song based on a recorded sample from microphone 908. Based on the metadata of the song, two effects are shown. Visual effect 910 is a hat, and visual effect 912 is big eyes. The visual effect 910 is considered as an overlay effect since it is applied over the images captured by the camera of the user's device. The visual effect 912 is considered as a facial feature modification since it modifies a facial feature of a face detected within the images captured by the camera of the user's device. In embodiments, a reason field 961 may be displayed. The reason field conveys an explanation of a reason why the particular visual effects (910 and 912) were presented. In this way, if a user is presented with a visual effect that she likes, she can associate it with a particular song. Then, if she wants that same visual effect at a later time, she can play the same song to invoke the presentation of that effect.

Figure 9B:
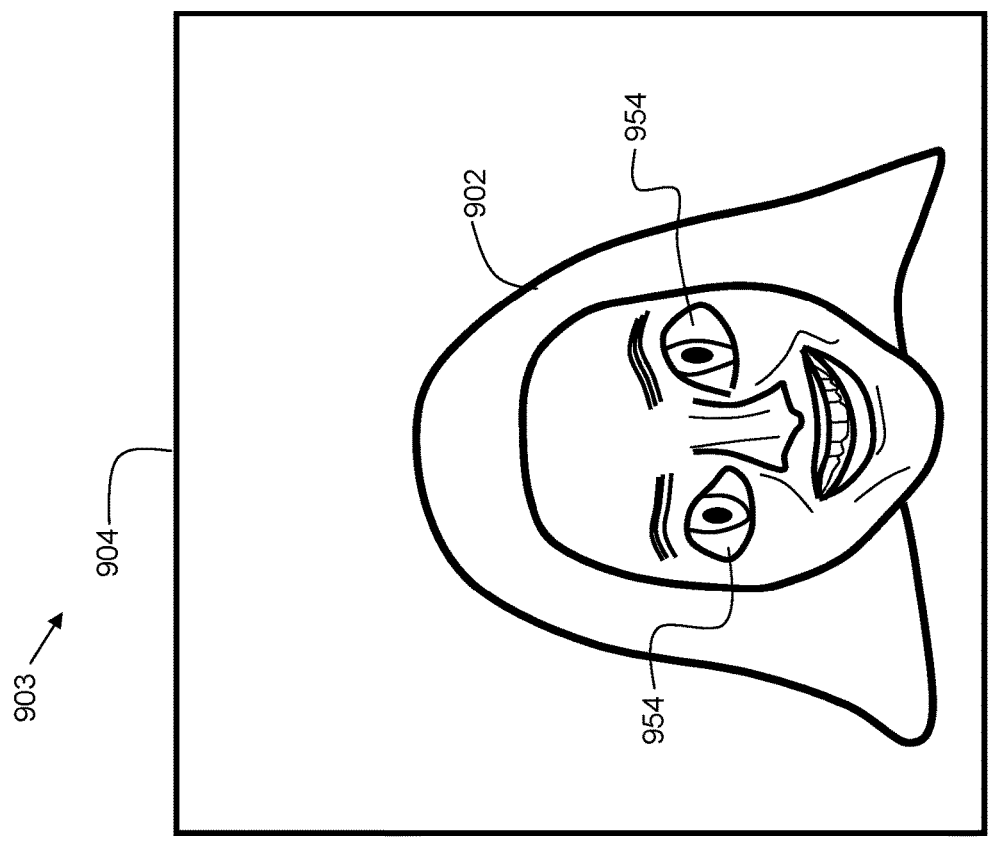
FIG. 9B is an example showing application of an effect presented in FIG. 9A.

FIG. 9B is an example 903 showing application of an effect presented in FIG. 9A. In the example, the user selected the big eyes 912. When that visual effect is applied, the user's eyes are shown in an exaggerated size (compare eyes 954 of FIG. 9B with eyes 952 of FIG. 9A). In embodiments, facial tracking may be used so that the visual effect can track the movement of the face 902 within image frame 904. In embodiments, various facial features of the face 902 may be identified and tracked. These facial features may include, but are not limited to, nose, eyes, eyebrows, cheeks, mouth, ears, and hair. In embodiments, the facial feature recognition may utilize a variety of image processing techniques such as edge detection, gradient processing, and landmark detection. Landmark detection may include, but is not limited to, mouth corner detection and eye corner detection. A bounding box may be used to process portions of a face. A color analysis may be used to identify features of differing colors such as lips and eyes. In embodiments, machine learning algorithms such as supervised learning with image classifiers may be used in detection of the facial features.

By utilizing facial tracking, as the user moves, the big eyes 954 appear to stay in place on the user's face 902. In embodiments, the image of the face 902 combined with the visual effect of the big eyes 954 is transmitted from a first client to a second client. Thus, referring again to FIG. 6, the user of client 610 may select a visual effect such as the big eyes, and then the image of the face with the facial feature modification of the big eyes is transmitted to client 612 via network 624. Thus, the user of client 612 sees the image as shown in FIG. 9B. As stated previously, the visual effect 912 is considered as a facial feature modification since it modifies a facial feature of a face detected within the images captured by the camera of the user's device. Thus, embodiments include selecting a visual effect by selecting a facial feature modification.

The visual effects described above are only exemplary, and many other overlay and facial feature modification visual effects are possible. Example overlay visual effects may include, but are not limited to, animal ears, animal nose, animal mouth, hair, hats, eyeglasses, emoji symbols, necklaces, tears, teeth, and headbands, to name a few. Example facial feature modification visual effects may include, but are not limited to, big eyes, small eyes, enlarged teeth, alteration of face shape, and the like. Additionally, other visual effects are possible, including overall image effects such as changing colors, converting an image to grayscale, and/or removing parts of the background of an image. Other visual effects are possible. These visual effects can be stored in a visual effects library such as shown at 614 in FIG. 6.

As can now be appreciated, embodiments of the present invention provide techniques for suggesting a visual effect based on detected sounds. The sounds can be speech and/or music. Tempo and song identification techniques may be used to determine criteria for selecting visual effects to suggest. The user selects a visual effect from the suggested visual effects and applies the visual effect to an image acquired by a camera. A modified image that combines the original acquired image with the visual effect is transmitted to another user during communication such as video chat, or alternatively, the modified image may be posted to a social media site such as Instagram™, Snapchat™, Facebook™, or the like. The images can be still images such as digital photographs, or videos. Thus, disclosed embodiments provide a convenient and fun way for users to customize their images for sharing.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for providing a suggested visual effect based on a detected sound pattern, comprising:
    receiving a first sound signal from a microphone coupled to a computing device;
    detecting a sound pattern within the first sound signal;
    selecting, based on the detected sound pattern, a visual effect from a plurality of visual effects in a visual effects library;
    presenting the visual effect as a selectable option in a user interface on the computing device;
    assigning, in response to the selection, a point to the visual effect in a database table;
    receiving a second sound signal similar to the first sound signal; and
    presenting the visual effect as a selectable option if the visual effect has a high point total as compared to point totals associated with other visual effects.

2. The method of claim 1, wherein detecting a sound pattern comprises detecting human speech.

3. The method of claim 2, further comprising:
    performing a speech-to text-process on the human speech to derive a text string;
    extracting keywords from the text string; and
    wherein the selecting the visual effect from the plurality of visual effects in the visual effects library comprises performing a query of the visual effects library using the extracted keywords.

4. The method of claim 1, wherein detecting a sound pattern comprises detecting music.

5. The method of claim 4, further comprising:
    performing a tempo detection process on the music to detect a tempo; and
    wherein the selecting the visual effect from the plurality of visual effects in the visual effects library comprises performing a query of the visual effects library using the detected tempo.

6. The method of claim 4, further comprising:
    performing a song detection process on the music to detect a song title; and wherein selecting a visual effect from a plurality of visual effects in a visual effects library comprises performing a query of the visual effects library using metadata derived from the song title.

7. The method of claim 6, wherein the metadata includes the song title.

8. The method of claim 6, wherein the metadata includes an occasion category.

9. The method of claim 1, wherein selecting a visual effect comprises selecting an overlay.

10. The method of claim 1, wherein selecting a visual effect comprises selecting a facial feature modification.

11. A computer system comprising:
a processor;
a microphone;
a camera;
a memory coupled to the processor, the memory containing instructions, that when executed by the processor, perform the steps of:
receiving a first sound signal from a microphone coupled to a computing device;
detecting a sound pattern within the first sound signal;
selecting, based on the detected sound pattern, a visual effect from a plurality of visual effects in a visual effects library;
presenting the visual effect as a selectable option in a user interface on the computing device;
applying the visual effect to an image obtained by the camera upon selection of the presented visual effect;
assigning, in response to the selection, a point to the visual effect in a database table;
receiving a second sound signal similar to the first sound signal; and
presenting the visual effect as a selectable option if the visual effect has a high point total as compared to point totals associated with other visual effects.

12. The system of claim 11, wherein the memory further contains instructions, that when executed by the processor, perform the step of detecting human speech within the sound pattern.

13. The system of claim 12, wherein the memory further contains instructions, that when executed by the processor, perform the steps of:
performing a speech-to-text process on the human speech to derive a text string;
extracting keywords from the text string; and
wherein the selecting the visual effect from the plurality of visual effects in the visual effects library comprises performing a query of the visual effects library using the extracted keywords.

14. The system of claim 11, wherein the memory further contains instructions, that when executed by the processor, perform the step of detecting human music within the sound pattern.

15. The system of claim 14, wherein the memory further contains instructions, that when executed by the processor, perform the steps of:
performing a tempo detection process on the music to detect a tempo; and
wherein the selecting the visual effect from the plurality of visual effects in the visual effects library comprises performing a query of the visual effects library using the detected tempo.

16. The system of claim 14, wherein the memory further contains instructions, that when executed by the processor, perform the steps of:
performing a song detection process on the music to detect a song title; and
wherein the selecting a visual effect from the plurality of visual effects in the visual effects library cmprises performing a query of the visual effects library using metadata derived from the song title.

17. A computer program product for providing a suggested visual effect based on a detected sound pattern for an electronic computing device comprising a computer readable storage medium having program instructions embodied therewith, the program instructions executable by a processor to cause the electronic device to:
receive a first sound signal from a microphone coupled to a computing device;
detect a sound pattern within the first sound signal;
select, based on the detected sound pattern, a visual effect from a plurality of visual effects in a visual effects library;
present the visual effect as a selectable option in a user interface on the computing device;
assign, in response to the selection, a point to the visual effect in a database table;
receive a second sound signal similar to the first sound signal; and
present the visual effect as a selectable option if the visual effect has a high point total as compared to point totals associated with other visual effects.

18. The computer program product of claim 17, further comprising program instructions executable by the processor to cause the electronic device to:
detect human speech within the sound pattern;
perform a speech-to-text process on the human speech to derive a text string;
extract keywords from the text string; and
perform the selection of the visual effect from the plurality of visual effects in the visual effects library by performing a query of the visual effects library using the extracted keywords.

19. The computer program product of claim 17, further comprising program instructions executable by the processor to cause the electronic device to:
detect music within the sound pattern;
perform a tempo detection process on the music to detect a tempo; and
perform the selection of the visual effect from the plurality of visual effects in the visual effects library by performing a query of the visual effects library using the detected tempo.

20. The computer program product of claim 17, further comprising program instructions executable by the processor to cause the electronic device to:
detect music within the sound pattern;
perform a song detection process on the music to detect a song title; and
perform the selection of the visual effect from the plurality of visual effects in the visual effects library by performing a query of the visual effects library using metadata derived from the song title.

* * * * *